United States Patent [19]
Butter et al.

[11] Patent Number: 5,870,437
[45] Date of Patent: Feb. 9, 1999

[54] APPARATUS AND METHOD FOR DETECTING END OF SERIAL BIT STREAM

[75] Inventors: Adrian Stephen Butter, Binghamton, N.Y.; James Paul Kuruts, Forest City, Pa.

[73] Assignee: International Business Machines Corporation, Armonk, N.Y.

[21] Appl. No.: 740,810

[22] Filed: Nov. 1, 1996

[51] Int. Cl.⁶ .................................................. H04L 27/06
[52] U.S. Cl. .......................................... 375/340; 375/342
[58] Field of Search ...................................... 375/340, 342, 375/368, 370; 370/67.1, 514

[56] References Cited

U.S. PATENT DOCUMENTS

| | | | |
|---|---|---|---|
| 4,370,748 | 1/1983 | Janc et al. | 375/340 |
| 5,077,758 | 12/1991 | Deluca et al. | 375/342 |

*Primary Examiner*—Stephen Chin
*Assistant Examiner*—Albert Park

*Attorney, Agent, or Firm*—Arthur J. Samodovitz

[57] ABSTRACT

A detector detects the end of a serial bit stream wherein the serial bit stream is based on one clock and the detector (and other associated circuitry) is based on a different, asynchronous clock. An Exclusive OR block receives the serial bit stream and a digital strobe signal according to IEEE High Performance Serial Bus Specification 1394. Based on this standard, one but not both of the serial bit stream and digital strobe signal changes level every data interval. The Exclusive OR block outputs a periodic signal when the serial bit stream and digital strobe signal are present but outputs a constant digital level upon termination of the serial bit stream and digital strobe signal. The detector also includes a first register coupled to receive the output of the receiver, a second register coupled to receive the output of the first register and a third register coupled to receive the output of the second register. All three registers are clocked simultaneously. The serial bit stream and digital strobe signal are asynchronous relative to the clock. Hardware logic determines when contents of the third register is same as contents of the second register; this indicates termination of the serial bit stream and digital strobe signal.

7 Claims, 3 Drawing Sheets

APPARATUS AND METHOD FOR DETECTING END OF SERIAL BIT STREAM

BACKGROUND OF THE INVENTION

The invention relates generally to electronic communications hardware and deals more particularly with a technique to detect the end of a serial bit stream which does not include an explicit end of bit stream signal.

There are many applications where serial data is transmitted from a source to a destination. For example, digital data may be sent serially from a television transmission station to a data converter in a subscriber's home via a satellite in a compressed format. The data converter receives the serial data and then converts it to parallel format for processing by digital decompression hardware. The data converter needs to determine when the serial bit stream has ended; otherwise the data converter could interpret the subsequent lull as a series of data bits of constant level. Some communication protocols require an explicit end of bit stream signal or "footer", and the data converter merely senses that signal to determine when the serial bit stream has ended. However, when the data is sent according to a standard defined by IEEE High Performance Serial Bus Specification 1394, there is no explicit signal identifying the end of the serial bit stream. Rather, the serial bit stream merely ends after the last of the normal data bits.

The problem is further complicated in data converters which are operated asynchronously relative to the serial bit stream which is received, i.e. the received serial bit stream is based on a clock of the source whereas the data converter generates and uses its own clock to determine the end of the serial bit stream (and perform the serial to parallel conversion and decompression).

Accordingly, a general object of the present invention is to provide circuitry and a method to detect the end of a serial bit stream which does not include an explicit end of bit stream signal.

A more specific object of the present invention is to provide a detector of the foregoing type which operates on a serial bit stream which is asynchronous relative to a clock within the detector.

SUMMARY OF THE INVENTION

The invention resides in a detector for detecting the end of a serial bit stream wherein the serial bit stream is based on one clock and the detector (and other associated circuitry) is based on a different, asynchronous clock. The receiver outputs a periodic signal from the serial bit stream and digital strobe signal. However, the receiver outputs a constant digital level upon termination of the serial bit stream and digital strobe signal. The detector includes a first register coupled to receive the output of the receiver, a second register coupled to receive the output of the first register and a third register coupled to receive the output of the second register. All three registers are clocked simultaneously. The serial bit stream and digital strobe signal are asynchronous relative to the clock. Hardware logic determines when contents of the third register is same as contents of the second register; this indicates termination of the serial bit stream and digital strobe signal.

DETAILED DESCRIPTION OF THE PREFERRED EMBODIMENTS

Figure 1:
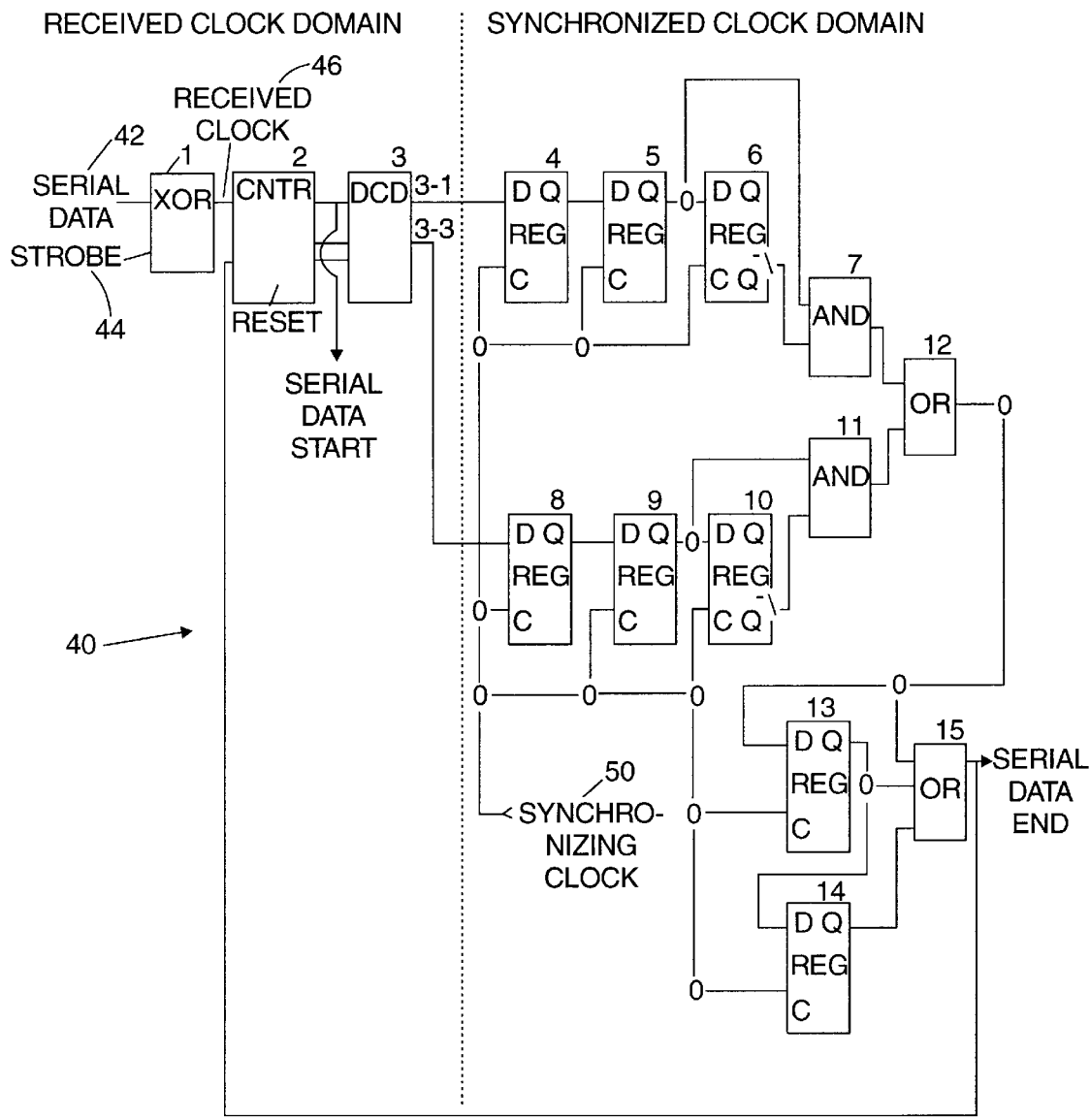
FIG. 1 is a logic diagram of a detector for the end of a serial bit stream according to the present invention.

Referring now to the drawings in detail wherein like reference numbers indicate like elements throughout, FIG. 1 illustrates detection circuitry generally designated 40 according to the present invention for detecting the end of an asynchronous serial bit stream which does not include an explicit signal or footer to indicate the end of the bit stream. A serial bit stream 42 is received at an input to an Exclusive OR block 1. By way of example, the serial bit stream comprises television data which was encoded and compressed at the source before transmission using Manchester encoding. Manchester encoding is described in U.S. Pat. No. 5,327,127 to Bristol et al. and UK patent 9011700.3, which patents are hereby incorporated by reference as part of the present disclosure. While the illustrated embodiment relates to a serial to parallel data converter for digital video, there are other applications such as a modem.

Figure 2:
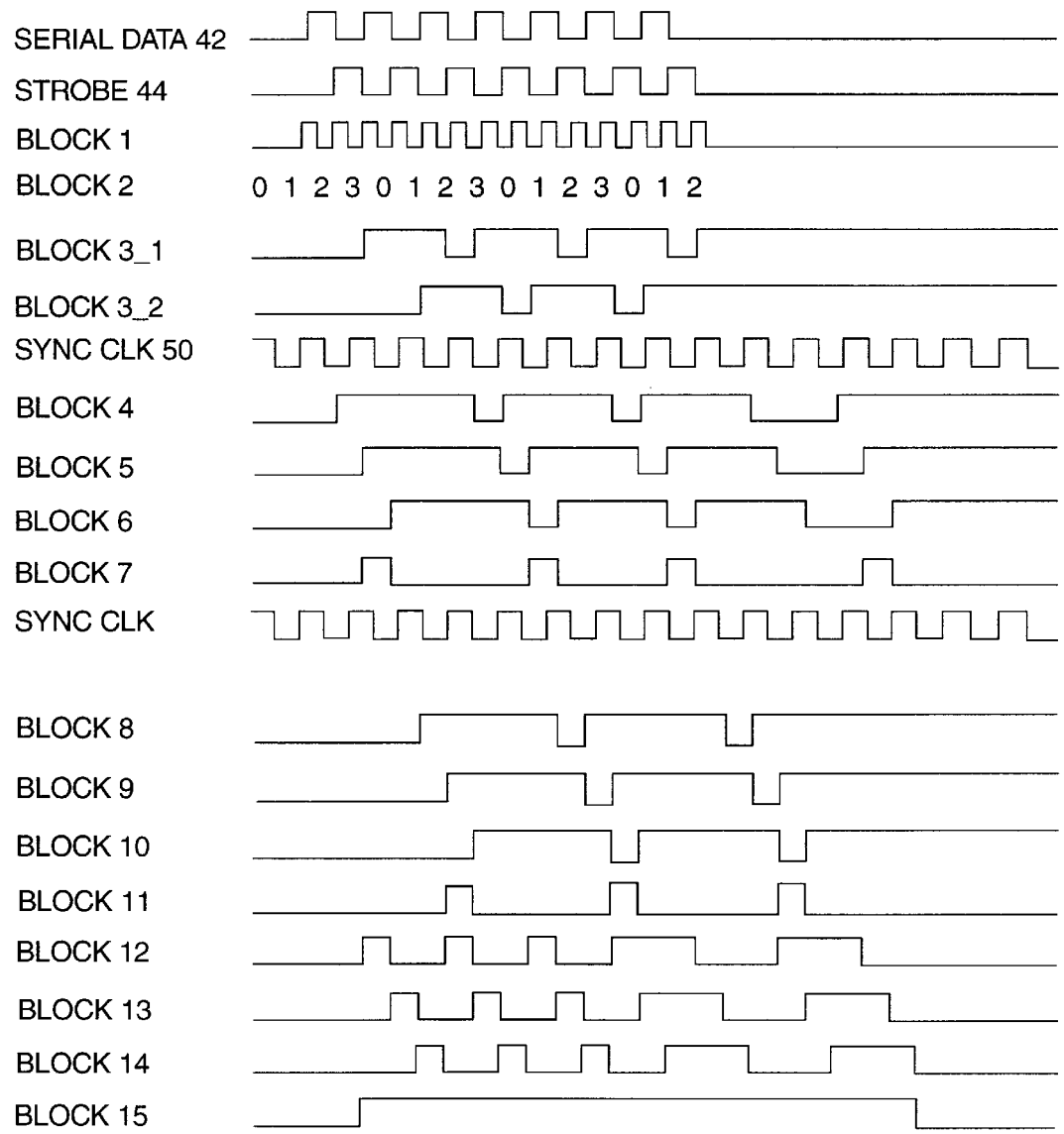
FIG. 2 is a timing diagram for the detector of FIG. 1.

The other input to the Exclusive OR block 1 is supplied by a strobe signal 44 which is received along with the serial bit stream. In the illustrated embodiment, the serial bit stream 42 and strobe signal 44 operate from a clock of the source, and the protocol of the data bit stream 42 and strobe signal 44 conform to IEEE High Performance Serial Bus Specification 1394. According to the IEEE standard, one but not both of the serial data 42 or the strobe signal 44 must change every "data interval", the duration of a single digital bit. The timing diagram of FIG. 2 illustrates a case where the serial data pattern is 1,0,1,0 etc., although in reality, the data does not alternate all the time. The output of the Exclusive OR block 1 is a "received" clock signal 46.

Figure 3:
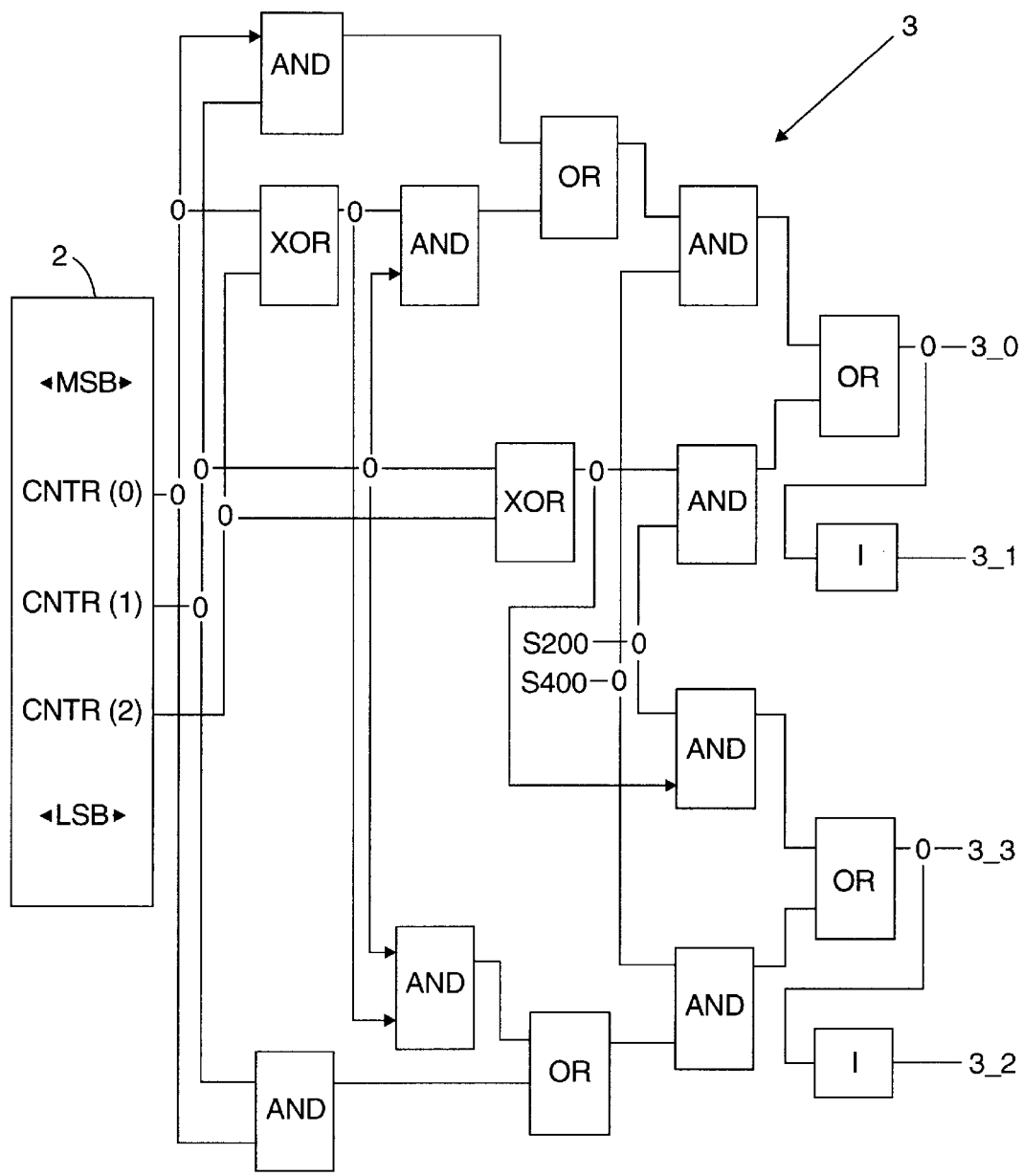
FIG. 3 is a detailed logic diagram for a decoder block of the detector of FIG. 1.

The received clock signal 46 is applied to a counter block 2 which counts the received clock signal 46 and wraps every four counts. The output of the counter block 2 is supplied to a decode block 3 which generates two outputs 3_1 and 3_13, 3 corresponding to the counter block outputs, as illustrated by the timing diagram of FIG. 2 and the logic diagram of FIG. 3. In the logic diagram, for a 200 megabits/second serial bit stream the S200 line is tied to a logic one and the S400 line is tied to a logic zero. For a 400 megabits/second serial bit stream the S400 line is tied to a logic one and the S200 line is tied to a logic zero. The outputs 3_1 and 3_3 reflect the presence of the serial data 42 and strobe signal 44. As long as the serial data 42 and strobe signal 44 are present, then the output 3_1 will alternate between the two digital levels in a periodic manner. Likewise, as long as the serial data 42 and strobe signal 44 are present, then the output 3_3 will alternate between the two digital levels in a periodic manner. Output 3_3 is the inverse of output 3_1.

Detector 40 also comprises a first bank of serial registers 4, 5 and 6 and a second bank of serial registers 8, 9 and 10. In the preferred embodiment, each of the registers is a one bit D-Flip Flop which is edge triggered. All of the registers utilize a synchronizing clock signal 50 generated within the detector 40 such that all of the registers 4–6 and 8–10 are triggered simultaneously. The input of register 4 receives the decoder 3_1 signal, the input of register 5 is coupled to the output of register 4 and the input of register 6 is coupled to the output of register 5 such that each 3_1 data bit propagates serially from register 4 to register 5 and to register 6. Likewise, the input of register 8 receives the decoder 3_3 signal, the input of register 9 is coupled to the output of register 8 and the input of register 9 is coupled to the output of register 8 such that each 3_3 data bit propagates serially from register 8 to register 9 and to register 10. Because the serial bit stream 42 and strobe signal 44 operate from a clock of the source, the synchronizing clock 50 of the destination is generated within the detector 40 and both clocks are asynchronous relative to each other, the outputs 3_1 and 3_3 are held long enough to ensure at least two occurrences of the synchronizing clock signal 50. The timing diagram of FIG. 2 illustrates that the frequency of the synchronizing clock signal is more than twice the frequency of the clock of the serial data 42 and strobe signal 44.

The general strategy of the present invention is to compare the contents of two successive registers in the first bank to each other and compare the contents of two successive registers in the second bank to each other. If either comparison indicates the same logic level in the two successive registers, then this indicates the end of the serial bit stream; as noted above, when the serial bit stream is present, the output 3_1 alternates between the two logic levels and the output 3_3 also alternates between the two logic levels. However, because the serial bit stream 42 and strobe signal 44 operate from a clock of the source, the synchronizing clock 50 is generated within the detector 40 and both clocks are asynchronous relative to each other, the last two registers in each bank are used for the comparison. Thus, when the last and next to last registers of the first bank are the same as each other or when the last and next to last registers of the second bank are the same as each other, this indicates that the serial data 42 and the strobe signal 44 have ended. Thus, the detector 40 includes an AND block 7 which receives the non-inverted (Q) output of register 5 and the inverted (Q not) output of register 6. The detector 40 also includes an AND block 11 which receives the non-inverted (Q) output of register 9 and the inverted (Q not) output of register 10. The outputs of both AND blocks 7 and 11 are supplied to the inputs of an OR block 12. The output of the OR block 12 is supplied to the input of register block 13 and the output of a register block 13 is supplied to the input of a register block 14. (In the illustrated example, both registers 13 and 14 are D flip-flops which are edge triggered.) The output of register block 13 is also supplied to the input of a three input OR gate 15. The outputs of OR block 12 and register block 14 are also supplied to the other inputs of OR gate 15. As illustrated by the timing diagram of FIG. 2, when the serial data 42 and strobe signal 44 are present, the outputs of AND blocks 7 and 11 provide complimentary logic one pulses, and the output of OR block 12 reflects the combination of logic one pulses from the outputs of AND blocks 7 and 11. The outputs of OR block 12, register 13 and register 14 reflect the output of OR block 12 at three successive periods. When there is no pulse during those three successive periods, the output of OR block 15 goes low to indicate the end of the serial bit stream.

The output of OR block 15 is also used to reset the counter block 2. Thus, when the next serial bit stream begins and the first bit is received, the counter block 2 counts to one. This first count of one after the bit stream begins indicates the start of the serial data 42. This information may be used for a serial to parallel data converter, decompression hardware or other function as required.

The detector 40 can be used in conjunction with a serial to parallel data converter described in U.S. patent application Ser. No. 08/740,811 entitled High Speed Asynchronous Serial To Parallel Data Converter filed Nov. 1, 1996 by A. Butter, L. Chieco, J. Kuruts and M. Sorna. That patent application is hereby incorporated by reference as part of the present disclosure.

Based on the foregoing, a detector for the end of an asynchronous serial bit stream has been disclosed. However, numerous modifications and substitutions can be made without deviating from the scope of the present invention. Therefore, the present invention has been disclosed by way of illustration and not limitation and reference should be made to the following claims to determine the scope of the present invention.

We claim:

1. A detector for detecting the end of a serial bit stream, said detector comprising:

first logic means for receiving the serial bit stream and a digital strobe signal, outputting a periodic signal from said serial bit stream and digital strobe signal, and outputting a constant digital level upon termination of said serial bit stream and digital strobe signal;

a first register coupled to receive the output of said first logic means upon a trigger of a clock, said serial bit stream and digital strobe signal being asynchronous relative to said clock;

a second register coupled to receive an output of said first register upon a subsequent trigger of said clock; and second logic means for determining when contents of said second register is same as contents of said first register indicating termination of said serial bit stream and digital strobe signal.

2. A detector as set forth in claim 1 wherein said clock is generated within said detector.

3. A detector as set forth in claim 1 further comprising a third register interposed between said first logic means and said first register, the output of said first logic means propagating from said third register, to said first register and to said second register upon successive triggers of said clock.

4. A detector as set forth in claim 1 wherein said first logic means has a second output which outputs a second periodic signal from said serial bit stream and digital strobe signal, said first logic means outputting from said second output a second constant digital level upon termination of said serial bit stream and digital strobe signal, said second periodic signal and said second constant level being inverses of the first said periodic signal and the first said constant level, respectively;

a third register coupled to receive said second output of said first logic means upon the first said trigger of said clock; and a fourth register coupled to receive an output of said third register upon said subsequent trigger of said clock; and wherein said second logic means determines when contents of said fourth register is same as contents of said third register indicating termination of said serial bit stream and digital strobe signal.

5. A detector as set forth in claim 4 further comprising a fifth register interposed between said second output of said first logic means and said third register, said second output propagating from said fifth register, to said third register and to said fourth register upon successive triggers of said clock.

6. A detector as set forth in claim 1 wherein said serial bit stream and said digital strobe signal conform to IEEE High Performance Serial Bus Specification 1394.

7. A detector as set forth in claim 1 wherein one but not both of said serial bit stream and said digital strobe signal changes state every period of a clock which controls timing of said serial bit stream and said digital strobe signal.

\* \* \* \* \*